United States Patent [19]
Schultz

[11] 4,263,031
[45] Apr. 21, 1981

[54] METHOD OF PRODUCING GLASS OPTICAL FILAMENTS

[75] Inventor: Peter C. Schultz, Painted Post, N.Y.

[73] Assignee: Corning Glass Works, Corning, N.Y.

[21] Appl. No.: 914,346

[22] Filed: Jun. 12, 1978

[51] Int. Cl.³ .......................................... C03B 37/025
[52] U.S. Cl. .................................. 65/3 A; 65/30 R; 65/18
[58] Field of Search .............. 65/3 A, DIG. 7, 32, 65/30 R, 31, 18

[56] References Cited

U.S. PATENT DOCUMENTS

| | | | |
|---|---|---|---|
| 3,859,073 | 1/1975 | Schultz | 65/DIG. 7 |
| 3,864,113 | 2/1975 | Dumbaugh, Jr. et al. | 65/DIG. 7 |
| 3,933,454 | 1/1976 | DeLuca | 65/3 A |
| 3,938,974 | 2/1976 | Macedo et al. | 65/3 A X |
| 3,943,218 | 3/1976 | Dietze et al. | 65/32 X |
| 3,980,459 | 9/1976 | Li | 65/3 A X |
| 4,030,901 | 6/1977 | Kaiser | 65/32 X |
| 4,110,093 | 8/1978 | Macedo et al. | 65/31 |
| 4,125,388 | 11/1978 | Powers | 65/3 A |
| 4,165,223 | 8/1979 | Powers | 65/18 X |

Primary Examiner—William F. Smith
Attorney, Agent, or Firm—William J. Simmons, Jr.; Walter S. Zebrowski

[57] ABSTRACT

A method of incorporating an additive or dopant oxide into a glass body produced by the oxidation of vaporous source material in a flame. The resultant glassy particles are deposited to form a porous preform having a uniform refractive index. During the consolidation process, the preform is subjected to an atmosphere including a drying agent which penetrates the interstices of the soot preform to simultaneously dry and dope the preform.

18 Claims, 7 Drawing Figures

METHOD OF PRODUCING GLASS OPTICAL FILAMENTS

BACKGROUND OF THE INVENTION

U.S. Pat. No. 2,272,342, granted Feb. 10, 1942 to J. S. Hyde, describes a glass preparation technique based on the so-called flame hydrolysis process which employs vapor phase oxidation of high purity vapors to form finely divided particles of glass referred to as "soot". This soot may be collected in particulate form, or may be deposited on a mandrel or other support as a preform. The preform may be consolidated in position, or by a separate heat treatment.

Subsequent patents including U.S. Pat. Nos. 2,326,059 granted Aug. 3, 1943 to M. E. Nordberg and 2,239,551 granted Apr. 22, 1941 to R. H. Dalton et al. describe methods of producing glasses by flame hydrolysis wherein the glass is composed of an oxide mixture, in particular a fused silica-type glass incorporating small amounts of one or more additional oxides such as titania or alumina. In general, these methods involve forming a mixture of volatile compounds in the desired proportions in a stream of gas fed to a combustion burner. The mixture of vapors is then oxidized to deposit a glass body or preform composed of a corresponding oxide mixture.

The processes described in the aforementioned Hyde, Dalton and Nordberg patents are capable of preparing very high purity glasses and therefore have formed the basis for recent improved methods of forming low loss glass optical waveguide filaments. The flame hydrolysis technique has been employed to prepare single mode waveguides and multimode waveguides of both the step-index and graded-index type. Various methods employing the flame hydrolysis as well as other techniques for forming such filaments are taught in U.S. Pat. Nos. 3,737,292; 3,823,995 and 3,884,550. In accordance with the teachings of these three last mentioned patents, a coating of glass soot is applied radially to a substantially cylindrical mandrel or starting member by means of a flame hydrolysis burner. Fuel gas and oxygen or air are supplied to the burner, and this mixture is burned to produce a flame. The vapor of a source material is introduced into the flame and the resultant reaction forms a glass soot which is directed toward the mandrel. The mandrel may be rotated and translated with respect to the flame to form uniform glass soot coatings thereon. Since the resultant filament consists of a glass core surrounded by a layer of cladding glass having a refractive index lower than that of the core, the refractive index of the first deposited layers must be higher than that of the finally deposited layers. This is usually accomplished by employing the flame hydrolysis process to form the core of a base glass to which there has been added a dopant to increase the refractive index thereof. The cladding layer can then consist of the base glass alone or combined with a smaller amount of the same dopant material or combined with another dopant material which provides the desired lower refractive index.

Another method of utilizing the flame hydrolysis process to form optical waveguide filaments is taught in U.S. Pat. No. 4,062,655. In accordance with the teachings of that patent the burners are located longitudinally of the endface of the starting member so that the glass soot produced thereby deposits on the endface and builds up longitudinally. Since the starting member is disposed at the end of the resultant preform, there is no aperture therethrough.

Mixed oxide glasses can be produced by these earlier methods, but it is frequently difficult to avoid condensation during delivery of certain vapors at elevated temperatures to a combustion flame. It may also be difficult to control relative rates of vaporization of some reactants, and hence proportions of certain oxides in the final product. Two improved methods of introducing an oxide additive into a glass produced by flame hydrolysis are disclosed in my U.S. Pat. Nos. 3,859,073 and 3,864,113. Both of these methods require, as an initial step, that particles of the primary glass former be produced by flame hydrolysis and deposited to form a porous body. In accordance with the teachings of U.S. Pat. No. 3,859,073 the porous body or preform is impregnated, in part at least, with a dopant which may be dissolved or suspended in a vehicle which must be removed by a method such as heating, air drying or the like. The method of U.S. Pat. No. 3,864,113 requires that the preform be impregnated with a vaporized dopant which condenses within the pores on cooling. In accordance with the teachings of both of these patents, the preform is then thermally consolidated with the dopant dispersed therein. After the pores of the preform have been impregnated by either of the two aforementioned techniques, the preform is subjected to a sintering or consolidating heat treatment to form a dense glass body free from particle boundaries.

U.S. Pat. No. 3,938,974 issued to P. B. Macedo et al. related to a method of adding a dopant to another type of porous glass preform. A glass which is separable into at least two phases, one of which is soluble, is heated to cause phase separation. The soluble phase is leached out to form a porous glass preform, the interconnected pores of which are thereafter stuffed with a dopant. The preform is then dried, thereafter consolidated to close the pores thereof and then drawn into a fiber.

In my two U.S. Pat. Nos. 3,859,073 and 3,864,113 and in the Macedo patent, there is initially formed a porous preform having a substantially constant refractive index throughout, and that preform is subjected to a dopant-containing vapor or liquid and thereafter cooled or dried to form a composite body consisting of a porous matrix having a dopant material dispersed throughout. Subsequently, the doped porous preform is thermally consolidated to form a dense glass body. It is thus seen that these prior art techniques require a number of sequentially performed steps to form a doped, dense glass body from a porous glass preform.

SUMMARY OF THE INVENTION

It is therefore an object of the present invention to provide a fast, economical method of forming dense, doped glass bodies from undoped or uniformly doped porous glass preforms. Another object of this invention is to provide a dense glass body having a radially graded refractive index from a porous glass preform having a uniform refractive index. A further object is to provide a faster and less expensive method of forming optical waveguides having extremely low concentrations of water and contaminants.

Briefly, the present invention pertains to a method of producing a glass article having a progressively varying radial refractive index distribution. An elongated, porous glass preform is provided, the refractive index of which is substantially uniform throughout. The preform is disposed in a furnace where it is heated to an elevated temperature. A stream of an atmosphere is caused to flow through the interstices of the preform, the atmosphere containing drying means and refractive index modifying means. The refractive index of the preform is modified in such a manner that it is greatest at the center of the preform. The preform is consolidated to form a dense glass article having a gradient refractive index.

The dense glass article may be heated to the drawing temperature thereof and drawn to reduce the cross-sectional area thereof and to form an optical filament having a solid cross-section.

DETAILED DESCRIPTION OF THE INVENTION

It is to be noted that the drawings are illustrative and symbolic of the present invention and there is no intention to indicate the scale or relative proportions of the elements shown therein.

The method of the present invention pertains to the simultaneous doping, drying and consolidation of tubular porous glass preforms. Porous preforms may be made by such methods as the flame hydrolysis technique or by leaching phase separated glass to form porous glass. Porous glass suitable for use in the method of the present invention can be made by the method disclosed in U.S. Pat. No. 2,221,709 issued to Hood et al. Briefly, the method includes (1) forming a tubular article from a borosilicate glass; (2) thermally treating the glass tube for a sufficient period of time to cause the glass to separate into a silica-rich and a silica-poor phase; (3) dissolving or leaching the silica-poor phase, usually with acid, to produce a porous structure composed of the silica-rich phase; (4) washing to remove leaching residue; and (5) drying. It is noted that the ordinary methods of drying such high silica content glass articles in air result in the incorporation of a minute amount of water in the structure of the glass. The resultant porous preform must therefore be subjected to further treatment to be described hereinbelow to render it substantially water-free, i.e., to reduce its water content to less than about ten parts per million.

The invention is hereafter described in greater particularity with respect to fused silica type glasses, a preferred embodiment of the present practical interest. However, it will be understood that the method of the present invention is not limited to this type of glass but may be employed in the production of glasses based on other glass forming oxides. For example, a germania ($GeO_2$) preform can be deposited on a mandrel by flame hydrolysis of $GeCl_4$, and such porous body may be dried, impregnated or doped and thermally consolidated as hereafter described. The invention may also be applied to porous preforms produced from such oxides as $B_2O_3$, $P_2O_5$, and the like. Finally, multicomponent porous preforms may be deposited by the flame hydrolysis technique and then doped with additives by the method of the present invention. Such multicomponent preforms include the $TiO_2$-$SiO_2$ and $Al_2O_3$-$ZrO_2$-$SiO_2$ glass systems described in the Nordberg and Dalton et al. patents mentioned earlier. Regardless of the composition employed, the soot composition is maintained substantially uniform throughout the preform so that the refractive index is also substantially constant throughout the preform.

Figure 1:
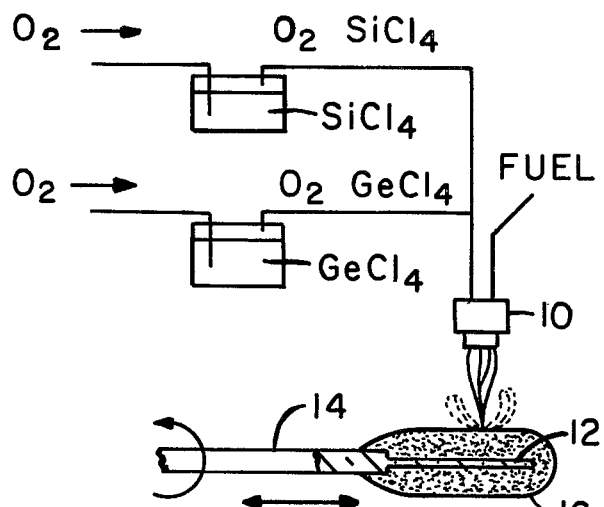
FIG. 1 illustrates the application of a coating of glass soot to a mandrel.

As shown in FIG. 1, a stream of carrier gas, in this case oxygen, is introduced into and passes through volatile compounds, in this case $SiCl_4$ and $GeCl_4$. The vapors of the volatile compounds are entrained by the carrier gas and the mixture passes through a tube leading to combustion burner 10 wherein the vapors of the volatile compounds are hydrolyzed to form particles of $GeO_2$-doped $SiO_2$ in the flame of the burner. A mandrel or support member 12, shown as a rod, is carried on the end of the handle 14 which is adapted to be rotated and oscillated either manually or by suitable mechanical devices. Normally, the mandrel will be rotated at a controlled rate, and likewise will be oscillated or moved back and forth at a controlled rate so that the particles are deposited uniformly over the mandrel, and subsequently over the surface of soot preform 16. The flame is maintained at a sufficiently low temperature so that small spherical doped silica particles of about 0.1 micron diameter are formed which bond tightly together in a preform body to leave a network of continuous open pores throughout the structure of the body. Such multicomponent preforms may be produced in the manner described in the Nordberg and Dalton et al. patents, or may be produced by subsequently developed methods such as described in U.S. Pat. No. 3,801,294 issued Apr. 2, 1974 to P. C. Schultz and F. W. Voorhees.

A network of continuous pores is required for effective impregnation. This means that the particles in the preform cannot be so densely packed as to interfere with vapor entry into the preform just prior to and during the consolidation process. In particular then, a substantial degree of incipient consolidation in the preform, that is collapse and closing of the pores to form a non-porous or closed-pore glassy mass, must be avoided.

There are several factors which may exert an influence on the preform development, and which must therefore be considered. Flame temperature is an important consideration of course. Also, the positioning of the mandrel or other preform carrier with respect to the flame. Finally, it is customary to rotate and translate the preform carrier during deposition, and these movements should be not only controlled but also maintained uniform in speed. Incipient consolidation may result from too hot a flame, from positioning of the mandrel and the preform too close to the flame, or from a movement of the mandrel that is either too slow or uneven. Tests have shown that a total porosity in the preform, as measured by mercury porosimetry, should be on the order of 75% for optimum processing. In general bodies having porosities less than 90% can be useful. Average pore size or diameter tends to decrease with more intense heat treatment and ultimately becomes zero as the body consolidates. Thus, as a general rule, pore diameter should not be less than 0.001 microns.

Since mandrel 12 is ultimately removed, the material thereof need only be such as to have a composition and coefficient of expansion compatible with the material of preform 16. A suitable material may be a normally produced glass having a composition similar to that of the layer 16 material although it does not need the high purity thereof. It may be normally produced glass having ordinary or even an excessive level of impurity or entrapped gas that would otherwise render it unsuitable for effective light propagation. The mandrel may also be formed of graphite, alumina or the like. The mandrel may be slightly tapered to facilitate removal of the soot preform.

The flame hydrolysis technique results in the formation of glasses having extremely low losses due to scattering and impurity absorption. Optical waveguides made by this technique have exhibited total losses as low as 1.1 dB/km at 1,060 nm. However, even when optical waveguides are formed of glasses having such high optical quality, light attenuation at certain regions of the wavelength spectrum may be so great as to preclude the use of such waveguides for the propagation of light in those regions. If no attempt is made to remove water from flame hydrolysis-produced soot preforms, such water will cause such an excessive attenuation in the 700–1100 nm region that a waveguide fiber produced from that preform will be essentially useless for the propagation of optical signals at most wavelengths within that region. At 950 nm the attenuation due to water is often greater than 100 dB/km. Various oxides from which such glass optical waveguides are formed, especially $SiO_2$, have a great affinity for water. However, after such glass waveguides are completely formed, the inner, light propagating portion thereof is inaccessible to water. The tendency of these glasses to absorb water is not detrimental to water-free glass optical waveguides after they are formed since most of the light energy is propagated in and around the core or axial portion of the fiber, and the presence of water on the outer surface has a negligible effect on the propagation of such energy. However, in the formation of optical waveguides by flame hydrolysis, residual water, which is produced by the flame, appears throughout those portions of the waveguide that have been produced by flame hydrolysis. Also, water is readily absorbed by the soot during handling in air prior to the consolidation process because of the extremely high porosity thereof.

Heretofore, a nonuniformly doped soot preform was subjected to a drying process prior to or during the soot consolidation step. For example, U.S. Pat. No. 3,933,454 and U.S. patent application Ser. No. 877,514, entitled "Method of Making Optical Waveguides" filed in the name of D. R. Powers on Feb. 13, 1978, now U.S. Pat. No. 4,125,388 both teach methods of drying a soot preform during consolidation thereof into a dense glass body. However, both of these techniques require that the soot preform be initially doped in a nonuniform manner, i.e., the surface portion of the soot preform must consist of a composition different than the soot within the preform.

The present invention requires that the soot preform be formed so that the composition thereof is initially substantially uniform throughout, and that such preform be subjected to an elevated temperature and to a flowing stream of an atmosphere containing means to dry the preform and to change the refractive index thereof. In the embodiment illustrated in FIG. 1, a preform consisting of $GeO_2$-doped $SiO_2$ is formed. It could also consist entirely of a single oxide, or it could comprise a mixture of any suitable combination of oxides, provided that the soot composition remains uniform throughout. It should be obvious that the method of the present invention is not limited to any particular group of possible soot compositions but is applicable to any initial soot composition which can thereafter be doped during the drying and consolidation process to form an optical waveguide draw blank.

Figure 2:
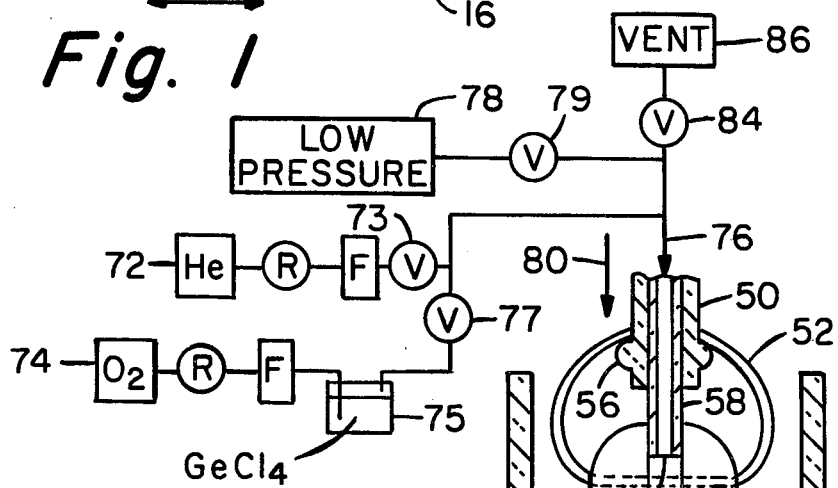
FIG. 2 is a schematic representation of a consolidation furnace and consolidation atmosphere system.
Figure 2:
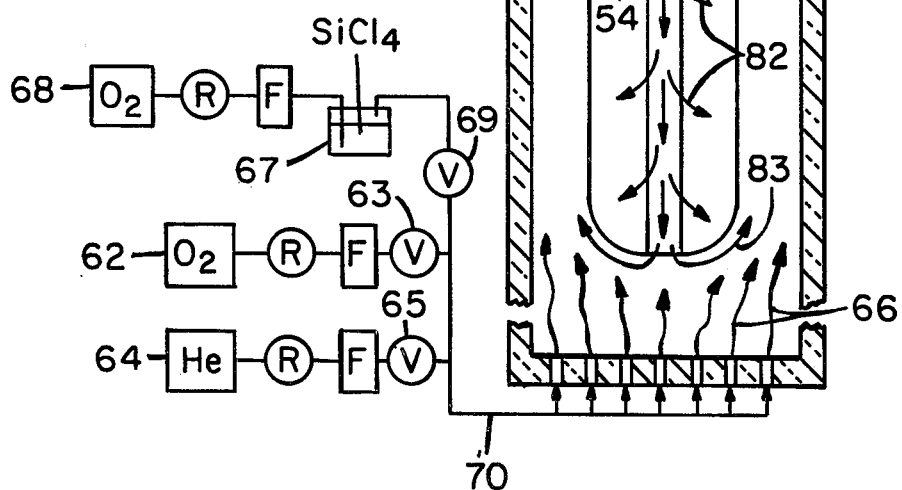

FIG. 2 illustrates an apparatus for simultaneously doping, drying and consolidating a soot preform. The vertical sidewalls of furnace 60 are broken to illustrate that the relative depth thereof is greater than that shown. In this figure flow regulators are schematically represented by the letter "R" within a circle, flowmeters by the letter "F" within a rectangle and valves by the letter "V" within a circle. The consolidation atmosphere system of FIG. 2 is merely representative of a number of systems which may be employed to provide the consolidation furnace and preform with appropriate gas and vapor mixtures. It is only necessary that the system provide preform 16 with a stream having a radial component of flow, said stream comprising an atmosphere of gases and/or vapors, which is capable of drying the preform and reacting within the soot preform at the furnace temperature to effect within the preform a refractive index change.

In accordance with a preferred method of the present invention, a soot preform is prepared in the manner described in conjunction with FIG. 1, i.e., the composition of the soot is relatively constant throughout the preform. It is preferred, however, that the refractive index of the deposited soot be relatively low in this embodiment since the central portion of the preform must be doped by a subsequent process to increase the refractive index thereof to a value greater than that of the remainder of the preform. An undoped $SiO_2$ soot preform is of particular interest with respect to this embodiment; however, a doped preform having a somewhat higher refractive index could be used as well.

The mandrel must be removed from the soot preform so that a gas conducting tube can be affixed to an end of the preform. This can be accomplished by merely securing the preform while the handle is pulled therefrom. Preform 16 is then suspended from tubular support 50 as shown in FIG. 2. Two platinum wires, of which only wire 52 is shown, protrude through preform 16 on opposite sides of aperture 54 and are affixed to support 50 just above flange 56. The end of gas conducting tube 58 protrudes from tubular support 50 and into the adjacent end of preform 16. The preform is consolidated by gradually inserting it into consolidation furnace 60. It is preferred that the preform be subjected to gradient consolidation, a technique taught in the aforementioned U.S. Pat. No. 3,933,454, whereby the bottom tip of the preform begins to consolidate first, the consolidation continuing up the preform until it reaches that end thereof adjacent to tubular support 50.

The consolidation temperature depends upon the composition of the glass soot and is in the range of 1250°–1700° C. for high silica content soot. It is also time dependent, consolidation at 1250° C. requiring a very long time. The preferred consolidation temperature for high silica content soot is between 1350° C. and 1450° C. Other glasses can be consolidated at lower temperatures, pure germania, for example, consolidating at about 900° C.

Preform 16 is simultaneously doped and dried by flowing a stream of an atmosphere containing both a doping agent and a drying agent into the center thereof, at least a portion of said atmosphere passing through the interstices of the porous preform walls to the outside surface thereof as indicated by arrows 82. The remainder of said atmosphere emanates from the end of the preform as indicated by arrows 83. By inserting a silica plug 88 (FIG. 6) into the end of aperture 54 the doping efficiency is increased by the elimination of flow 83. The resultant gases may be flushed away from the blank by a gas such as helium, oxygen, argon, neon or mixtures thereof, a mixture of helium and oxygen being illustrated in this embodiment. Helium is a preferred diluent gas since it is extremely effective in purging gases from the preform interstices prior to consolidation. Oxygen is often employed to reduce the attenuation of the resultant fiber. Such flushing gas reduces the opportunity for the highly reactive drying-doping gas stream to emerge from the preform, contact the furnace walls, and thereafter again come into contact with the preform. Thus, the likelihood of the drying-doping gas stream reacting with the furnace wall and transporting impurities to the preform is essentially eliminated.

Sources 62 and 64 of oxygen and helium, respectively, are connected by line 70 to orifices in the bottom of furnace 60, valves 63 and 65 being open. Undulated arrows 66 represent the flow of flushing gas from these orifices. Sources 72 and 74 of helium and oxygen, respectively, are connected through open valves 73 and 77 to line 76, the oxygen being bubbled through container 75 of GeCl$_4$ so that helium, oxygen and GeCl$_4$ vapor are present in line 76. Valves 69, 79 and 84 are presumed to be closed for purposes of the present discussion, whereby no gas or vapor can flow therethrough. A halogen such as chlorine, bromine or iodine is included in the stream of the dopant atmosphere in line 76, chlorine being the preferred drying agent. Also any dopant material that increases the refractive index of the preform soot may be employed, some examples being titanium, tantalum, tin, niobium, zirconium, aluminum, lanthanum, phosphorus and germanium. A chloride of the desired dopant material, e.g. GeCl$_4$, POCl$_3$ and the like, conveniently supplies both the drying agent and the dopant material. The flushing gas could flow from top to bottom of furnace 60, and means could be provided at the bottom thereof for removing the drying and flushing gases.

As indicated by arrow 80, preform 16 is inserted downwardly into furnace 60, the rate of insertion preferably being low enough to permit the tip of the preform to consolidate first. As soot preform 16 enters furnace 60 the dopant gas passes through tube 58 and into preform aperture 54 from which at least a portion thereof passes into and through the interstices of the preform as indicated by arrows 82. As the gas and/or vapor mixture flows through aperture 54 and through the preform interstices, the GeCl$_4$ reacts with oxygen according to the equation:

$$GeCl_4 + O_2 \rightarrow GeO_2 + 2Cl_2$$

The chlorine formed in these reactions removes hydroxyl groups from the glass according to the reactions:

where ≈SiOH denotes that the silicon atom is connected to three other parts of the glass network. The aforementioned reaction also causes the deposition of a thin layer, perhaps 50–100 μm thick, of a glass rick in GeO$_2$. The concentration of GeO$_2$ is greater at the center of the preform since the gas stream has a greater concentration of dopant material as it begins to flow into the preform interstices. After a portion thereof reacts to form the dopant oxide, the dopant concentration of the gas decreases as it flows toward the outer surface of the preform. Thus, a layer of glass rich in the dopant oxide is formed at the inner surface of the hollow dense glass blank providing it with the radial refractive index distribution of the type illustrated in FIG. 3. As in any process for making glass optical waveguides, attention must be given to such physical characteristics of the consolidated blank as rate of change of thermal expansion coefficient with changing radius. Too great a change in this characteristic can cause breakage to occur due to the unbalanced stresses in the consolidated blank.

Figure 4:
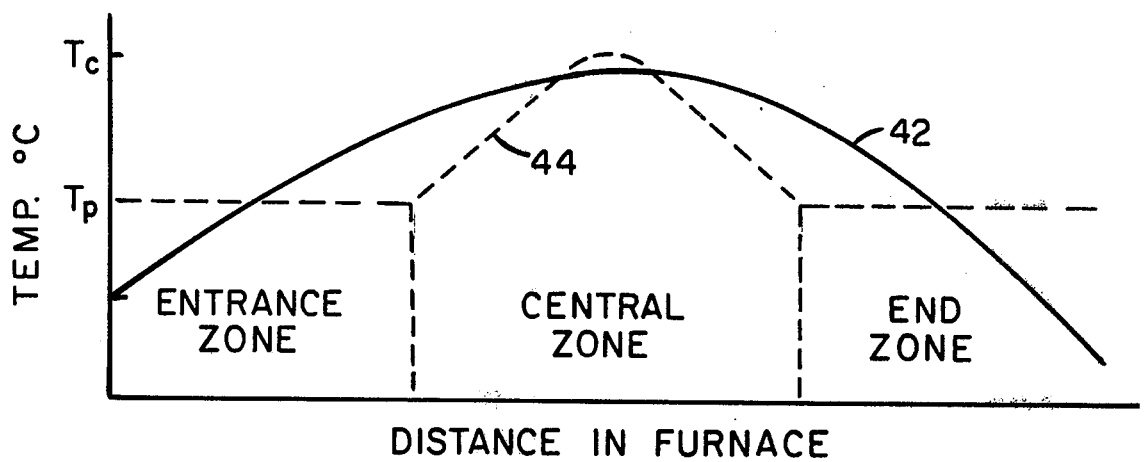
FIG. 4 is a graph showing two different consolidation furnace temperature profiles.

The maximum furnace temperature, which is preferably between 1350° C. and 1450° C. for high silica content soot, must be adequate to fuse the particles of glass soot and thereby consolidate the soot preform into a dense glass body in which no particle boundaries exist. The temperature profile of a conventional consolidation furnace is represented by curve 42 of FIG. 4.

It may be desirable to subject the preform to a presoak prior to subjecting it to consolidation temperatures. For example, the gases flowing into aperture 54 could be given additional time to dope the central portion of the preform prior to the time that the soot consolidates, thereby achieving a greater dopant concentration. For this purpose an entrance zone of the furnace, which is at least as long as the preform, should be maintained at a relatively constant temperature which is below the consolidation temperature as indicated by curve 44 of FIG. 4.

The minimum presoak temperature must be sufficiently high to cause the dopant compound that is supplied to the furnace to break down into its constituent parts. Table I gives the lowest practical temperatures for causing the listed chlorine compounds to break down and form chlorine and the appropriate oxide.

TABLE I

| Chlorine Compound | Min. Practical Reaction Temp. | Oxide Produced |
|---|---|---|
| GeCl$_4$ | 950° C. | GeO$_2$ |
| TiCl$_4$ | 500° C. | TiO$_2$ |
| SiCl$_4$ | 1100° C. | SiO$_2$ |
| POCl$_3$ | 850° C. | P$_2$O$_5$ |

The minimum practical presoak temperature for causing chlorine to leach GeO$_2$ from a soot preform is about 900° C.

The temperature T$_c$ of the central zone of the furnace may be sufficiently high to cause the preform to consolidate. This multi-zone furnace may have an end zone that has a relatively constant temperature profile similar to that of the entrance zone, or the temperature beyond the central zone may taper off at a slower rate such as that indicated by curve 42.

Figure 3:
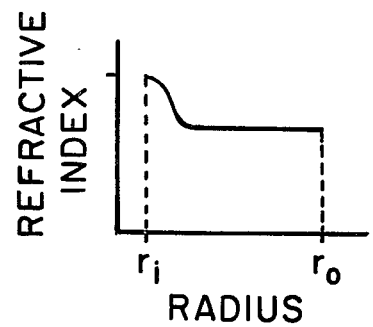
FIGS. 3, 5 and 7 are graphs illustrating refractive index profiles of consolidated optical waveguide blanks formed in accordance with various embodiments of the present invention.

The above-described methods are particularly useful for forming single mode waveguides which are difficult to form by conventional flame hydrolysis techniques, although multimode guides having refractive index profiles of the type illustrated in FIG. 3 can also be formed. When single mode waveguides are formed by conventional processes, only a single pass of the burner along the mandrel, depositing GeO$_2$-doped SiO$_2$, for example, would be allowed to obtain a 1:100 core-clad ratio. This is based on the assumption that current operating conditions would be employed, i.e., a soot layer having a thickness of about 30 μm would be deposited by the single pass of the burner. It is very difficult to control the composition and thickness of this layer from one run to another using such an approach. However, the present method can be readily employed to form the relatively small diameter core regions required of single mode waveguides.

Figure 5:
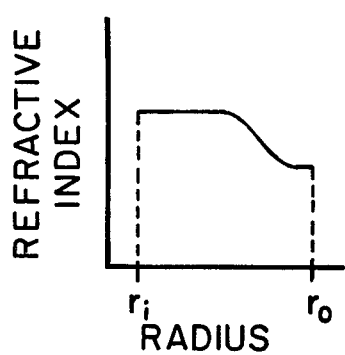
Figure 6:
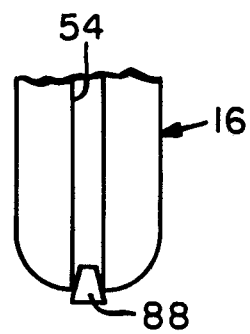
FIG. 6 is a cross-sectional view of the plugged end of a soot preform.

A further embodiment of this invention results in the formation of a consolidated glass article having a radial refractive index distribution of the type illustrated in FIG. 5. A uniformly doped soot preform is formed as described in conjunction with FIG. 1; however, the preform must contain a dopant that can be leached therefrom. For example, the composition of the soot throughout the entire preform could be 10 wt.% $GeO_2$ and 90 wt.% $SiO_2$. The mandrel is removed, and a silica plug 88 is inserted into one end of aperture 54 as shown in FIG. 6. The preform is attached to a support in the manner described above. The furnace is provided with either chlorine or a chlorine-containing compound to perform this leaching function. If a compound is employed, it is preferably one that reacts to produce, in addition to chlorine, an oxide such as $SiO_2$, the refractive index of which is relatively low. For example, if valve 69 is opened, oxygen from source 68 is bubbled through container 67 to provide line 70 with $SiCl_4$ vapor in addition to the previously mentioned oxygen and helium flushing gas mixture. The $SiCl_4$ flowing upwardly through the furnace reacts with oxygen to form chlorine according to the equation $$SiCl_4 + O_2 \rightarrow SiO_2 + 2Cl_2$$

The soot preform is initially subjected to a presoak by lowering it into the entrance zone of the furnace. A portion of the gas-vapor mixture flowing upwardly through the furnace is caused to flow radially inwardly through the interstices of the soot preform by opening valve 79 to connect low pressure means 78 to line 76. Means 78 may comprise a vacuum pump, a venting blower or the like. During this time, valves 73, 77 and 84 remain closed.

As the $SiCl_4$ and/or chlorine diffuses through the interstices of the preform, $GeO_2$ is leached therefrom. The greatest amount of leaching occurs at the outer portion of the preform, the amount of leaching decreasing with decreasing preform radius. Leaching due to chlorine is believed to occur in accordance with the following reaction:

$$Cl_2 + GeO_2(glass) \rightarrow GeOCl_2 \text{ or } GeCl_4 \text{ or other volatile germanium products}$$

The $SiCl_4$ can react directly with $GeO_2$ in accordance with the following:

$$SiCl_4 + GeO_2(glass) \rightarrow SiO_2(glass) + GeCl_4$$

The chlorine can also remove hydroxyl groups from the preform as described above. The refractive index of the soot preform is thus modified to form the index gradient illustrated in FIG. 5.

At the end of the presoak, valves 79 and 69 are closed, and valve 84 is opened to connect aperture 54 to vent 86. The preform is then consolidated by lowering it slowly through the hot zone of the furnace.

Figure 7:
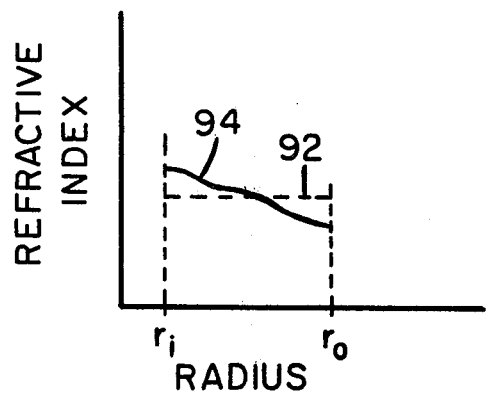

A combination of the aforementioned embodiments can be employed to achieve a refractive index profile of the type illustrated in FIG. 7. A doped preform is initially formed having a constant refractive index throughout as indicated by dashed line 92 of FIG. 7. The preform is plugged as shown in FIG. 6 and is lowered into the entrance zone of the furnace. The above described embodiments are sequentially performed whereby dopant material is leached from the outer portion of the preform, and additional dopant material is deposited at the central portion thereof. The resultant refractive index distribution of the type represented by curve 94. The preform is then lowered into the central hot zone of the furnace where it is consolidated into a dense glass article.

All of the above-described embodiments of the present invention result in a consolidated dense glass article that is free from particle boundaries. The glass article, sometimes referred to as a draw blank, may be cleaned and etched in accordance with conventional practice prior to forming a filament therefrom. The draw blank is then heated to its drawing temperature and is drawn to close the aperture and to reduce the outside diameter to the desired filament size.

The invention will be further described with reference to specific embodiments thereof which are set forth in the following examples. In these examples, which pertain to the manufacture of optical waveguides, the inside diameter of the furnace muffle is about 8.3 cm and the length thereof is about 127 cm.

EXAMPLE 1

A tubular mandrel of fused quartz, approximately 0.6 cm in diameter and about 50 cm long is secured to a handle. Dry oxygen is bubbled at the rate of 2000 cc/min through a container of $SiCl_4$ that is maintained at a temperature of 40° C. The resultant vapors entrained within the oxygen are passed through a gas-oxygen flame where the vapor is oxidized to form a steady stream of particles of pure fused silica ($SiO_2$). The stream is directed at the mandrel and a soot coating comprising particles of this composition is applied up to about 6 cm in diameter. The mandrel is pulled from the soot preform, thereby leaving a soot preform weighing 120 g and having a diameter of 6 cm and a length of 30 cm. The drying gas tube 58 of FIG. 2 is inserted into the preform aperture which has a diameter of about 0.6 cm. Platinum wire is employed to attach the upper end of the preform to a tubular support.

The apparatus of FIG. 2 is employed, the following modifications having been made. Valves 73, 79 and 84 are closed, and valve 77 is open. Dry oxygen flowing at a rate of 20 cc/min is bubbled through the $GeCl_4$ in container 75 which is maintained at a temperature of 16° C. With valves 63 and 69 closed and valve 65 open, a flushing gas of 25 l/min helium flows upward through the furnace. As the drying gas mixture flows into the preform aperture, the preform is held in the entrance zone of the furnace for 45 minutes. The preform is then lowered into the furnace at about 25 cm/hr, the maximum furnace temperature being about 1460° C. The preform is completely consolidated in about 90 minutes, and the resultant dense glass body is withdrawn from the furnace and cooled. It is then subjected to a 3 minute etch in HF, degreased, dried, flameworked for hanging in the draw furnace, and subjected to an additional 3 minute etch in HF.

The resultant draw blank, which has a refractive index profile of the type shown in FIG. 3, is heated to a temperature of 1830° C. and drawn to reduce the diameter thereof and collapse the central hole. The rate of drawing is such that a final filament diameter of 125 μm is achieved. From a microscopic examination of the endface of the filament during the propagation of light therethrough, it is estimated that a core region of higher refractive index than the remainder of the filament is about 10 μm in diameter.

EXAMPLE 2

A tapered alumina handle 80 cm long and approximately 0.6 cm in diameter at one end and 0.59 cm at the other end is secured in a lathe. It is rotated at 180 RPM and translated at 40 cm/min. Liquid $SiCl_4$ and $GeCl_4$ are maintained at 37° C. each in first and second containers. Dry oxygen is bubbled through the first container at 1300 cc/min and through the second container at 400 cc/min. The resultant vapors which are entrained within the oxygen are combined and passed through a gas-oxygen flame where the vapor is oxidized to form a steady stream of soot particles having a composition of 16 wt.% $GeO_2$ and 84 wt.% $SiO_2$. The stream is directed at the mandrel, and soot coatings comprising these particles is applied up to 5 cm in diameter. The starting member is pulled from the soot preform, thereby leaving a hollow soot preform weighing 450 g and having a diameter of 5 cm and a length of 50 cm. The preform is attached to the tubular support as described in Example 1, and a fused silica plus is inserted into the bottom of the aperture.

The preform is initially subjected to a presoak step wherein it is inserted into the entrance zone of the furnace which is heated to a temperature of 1050° C. At this time valves 79, 69 and 65 are opened, the remaining valves being closed. A liquid nitrogen trap and vacuum pump are connected to line 76 through valve 79. The vacuum is adjusted so that about 1 l/min of gas flows through line 76. Oxygen and helium flow at rates of 4 l/min and 20 l/min from sources 68 and 64, respectively. The $SiCl_4$ in bubbler 67 is maintained at a temperature of 37° C.

After one hour, valves 79 and 69 are closed, and valve 84 is opened. The preform is then lowered at a rate of 0.5 cm/min through the hottest part of the furnace, the temperature of which is about 1400° C. The preform is completely consolidated after the top portion thereof has passed through the hot region. The resultant dense glass body, the refractive index profile of which is represented by the curve of FIG. 5, is withdrawn from the furnace and cooled.

The resultant draw blank is etched and drawn into an optical waveguide filament in the manner set forth in Example 1.

I claim:

1. A method of forming a glass article comprising the steps of
   providing a tubular glass preform having an aperture therethrough, said preform having a network of continuous open pores throughout its mass, the composition throughout said preform being substantially uniform,
   disposing said preform in a furnace where it is heated to an elevated temperature,
   flowing into said preform aperture a stream of an atmosphere containing a drying agent for removing water from said preform and a doping agent, at least a portion of said stream flowing outwardly from the center of said preform through the interstices thereof to the outer surface thereof, said doping agent forming a dopant oxide, the concentration of which is greatest at the inner surface of said preform and which progressively decreases with increasing radius within said preform so that the refractive index within said preform is a maximum at the inner surface of said preform and decreases with increasing radius, and
   consolidating said preform to form a tubular, dense glass body having a gradient refractive index.

2. The method of claim 1 wherein the steps of flowing and consolidating are simultaneously performed.

3. The method of claim 1 wherein the step of consolidating occurs after the step of flowing.

4. The method of claim 1 further comprising the steps of heating said dense glass article to the drawing temperature thereof, and drawing said dense glass article to close said aperture and to reduce the cross-sectional area thereof, thereby forming a glass optical waveguide filament.

5. The method of claim 1 wherein said drying agent comprises chlorine.

6. The method of claim 5 wherein said atmosphere comprises a compound which reacts to form chlorine and said doping agent.

7. The method of claim 6 wherein said preform comprises a glass doped with a dopant material to increase the refractive index thereof, said method further comprising the step of flowing along the outside of said preform a stream of a flushing atmosphere containing means to leach dopant material from the outer portion of said preform.

8. The method of claim 6 wherein the step of flowing is prior to the step of consolidating and wherein the step of flowing comprises subjecting said preform to a temperature lower than the consolidation temperature of said preform but sufficiently high to cause said compound to break down and form chlorine and said dopant agent.

9. A method of producing a light-conducting glass fiber having a refractive index distribution which progressively decreases from a maximum value at the axis thereof to a minimum value at some radius thereof, said method comprising
   providing a substantially cylindrical mandrel,
   depositing on said mandrel a coating of flame hydrolysis-produced glass soot to form a water-containing soot preform having a network of continuous open pores throughout its mass, the composition of said soot being substantially uniform throughout said preform,
   removing said mandrel to form a soot preform having an aperture therethrough,
   flowing into said preform aperture a stream of an atmosphere containing a drying agent and a doping agent for modifying the refractive index of said preform in such a manner that the refractive index of the inner portion of said preform is greater than that at the outer portion thereof, at least a portion of said stream flowing outwardly from the center of said preform through the interstices therein to the outer surface thereof, to simultaneously dope said preform and remove water therefrom, heating said preform to a temperature within the consolidation temperature range thereof for a time sufficient to cause said soot particles to fuse and form a dense glass article, heating said dense glass article to the drawing temperature thereof, and drawing said dense glass article to close said aperture and to reduce the cross-sectional area thereof, thereby forming an optical waveguide filament.

10. The method of claim 9 wherein said drying agent comprises chlorine.

11. The method of claim 10 wherein said atmosphere comprises a compound that reacts to form chlorine and said doping agent.

12. The method of claim 12 wherein said preform comprises glass particles doped with a dopant material to increase the refractive index thereof, said method further comprising the step of flowing along the outside of said preform a stream of a flushing atmosphere containing means to leach said dopant material from the outer portion of said preform.

13. The method of claim 11 wherein said drying atmosphere further comprises helium and oxygen.

14. The method of claim 13 wherein said flushing atmosphere further comprises helium and oxygen.

15. The method of claim 9 further comprising the step of flowing along the outside of said preform a stream of a flushing atmosphere.

16. The method of claim 9 wherein said preform comprises a glass doped with a dopant material to increase the refractive index thereof, and wherein, prior to the step of heating said preform to a temperature within the consolidation temperature range, the following steps are performed:

heating said preform to a temperature less than the consolidation temperature of said preform, reducing the pressure within said preform to a value less than that at the outside thereof, and flowing along the outside of said preform a stream of a flushing atmosphere containing means to leach said dopant material from said preform.

17. A method of forming a glass article comprising the steps of providing an elongated tubular glass preform having an aperture therethrough and having a network of continuous open pores throughout its mass, the composition throughout said preform being substantially uniform, disposing said preform in a furnace where it is heated to an elevated temperature, subjecting the outer surface of said preform to an atmosphere containing a drying agent for removing water from said preform and an agent for modifying the refractive index of said preform in such a manner that the refractive index of the inner portion of said preform is greater than that at the outer portion thereof, reducing the pressure within said preform aperture to a value lower than that at the outside surface thereof, so that said atmosphere flows radially inwardly through said preform, and consolidating said preform to form a tubular, dense glass body having a gradient refractive index.

18. A method of forming a glass article comprising the steps of providing an elongated tubular glass preform having an aperture therethrough and having a network of continuous open pores throughout its mass, the composition throughout said preform being substantially uniform, disposing said preform in a furnace where it is heated to an elevated temperature, flowing radially outwardly through the interstices of said preform a stream of an atmosphere containing a drying agent for removing water from said preform and a doping agent for increasing the refractive index at the inner portion of said preform, flowing radially inwardly through said preform a stream of an atmosphere containing a drying agent for removing water from said preform and a doping agent for lowering the refractive index at the outer portion of said preform, and consolidating said preform to form a tubular, dense glass body having a gradient refractive index.

* * * * *